United States Patent [19]
Yokoyama et al.

[11] Patent Number: 4,519,558
[45] Date of Patent: May 28, 1985

[54] TAPE PLAYER

[75] Inventors: Hideo Yokoyama, Yokohama; Seiji Tomita, Yokosuka; Shigeo Yamada, Tokyo, all of Japan

[73] Assignee: Tokyo Shibaura Denki Kabushiki Kaisha, Kawasaki, Japan

[21] Appl. No.: 546,120

[22] Filed: Oct. 27, 1983

[30] Foreign Application Priority Data

Nov. 19, 1982 [JP] Japan .................. 57-202953

[51] Int. Cl.$^3$ .................. G03B 1/04; G11B 15/32
[52] U.S. Cl. .................. 242/186; 360/74.3
[58] Field of Search .............. 242/186, 191, 200–204; 360/74.1, 74.2, 74.3, 96.1, 96.5, 96.6, 137

[56] References Cited
U.S. PATENT DOCUMENTS

| 3,608,845 | 9/1971 | Kozu et al. ............. 242/186 |
| 3,759,463 | 9/1973 | Yoshii .................. 242/186 |
| 4,021,005 | 5/1977 | Takemoto et al. ......... 242/198 |
| 4,380,322 | 4/1983 | Yeh ..................... 242/198 |

Primary Examiner—Leonard D. Christian
Attorney, Agent, or Firm—Finnegan, Henderson, Farabow, Garrett & Dunner

[57] ABSTRACT

A tape player of small size and weight capable of detecting the end of the tape with a simple mechanism and automatically shutting off the tape player when the end of the tape is detected. The tape player includes a drive gear driven by a motor; a fast speed gear, which drives the tape during the rewind and fast forward modes; and a normal speed gear, which drives the tape during the record and playback modes. The drive gear, fast speed gear, and normal speed gear are mounted on the same spindle and are connected by coupling means that cause the gears to rotate together until the end of the tape is reached. The normal speed gear is connected via a friction coupling to a bias lever that forces cam following means on a shut-off lever to follow an eccentric cam on the drive gear. When the end of the tape is reached, one of the coupling means uncouples, the normal speed gear stops rotating, the bias lever releases the shut-off lever, the cam following means engages an engaging part on the drive gear, and the engaging part rotates the shut-off lever to a position where it engages a switch means, cutting off power to the tape player.

17 Claims, 17 Drawing Figures

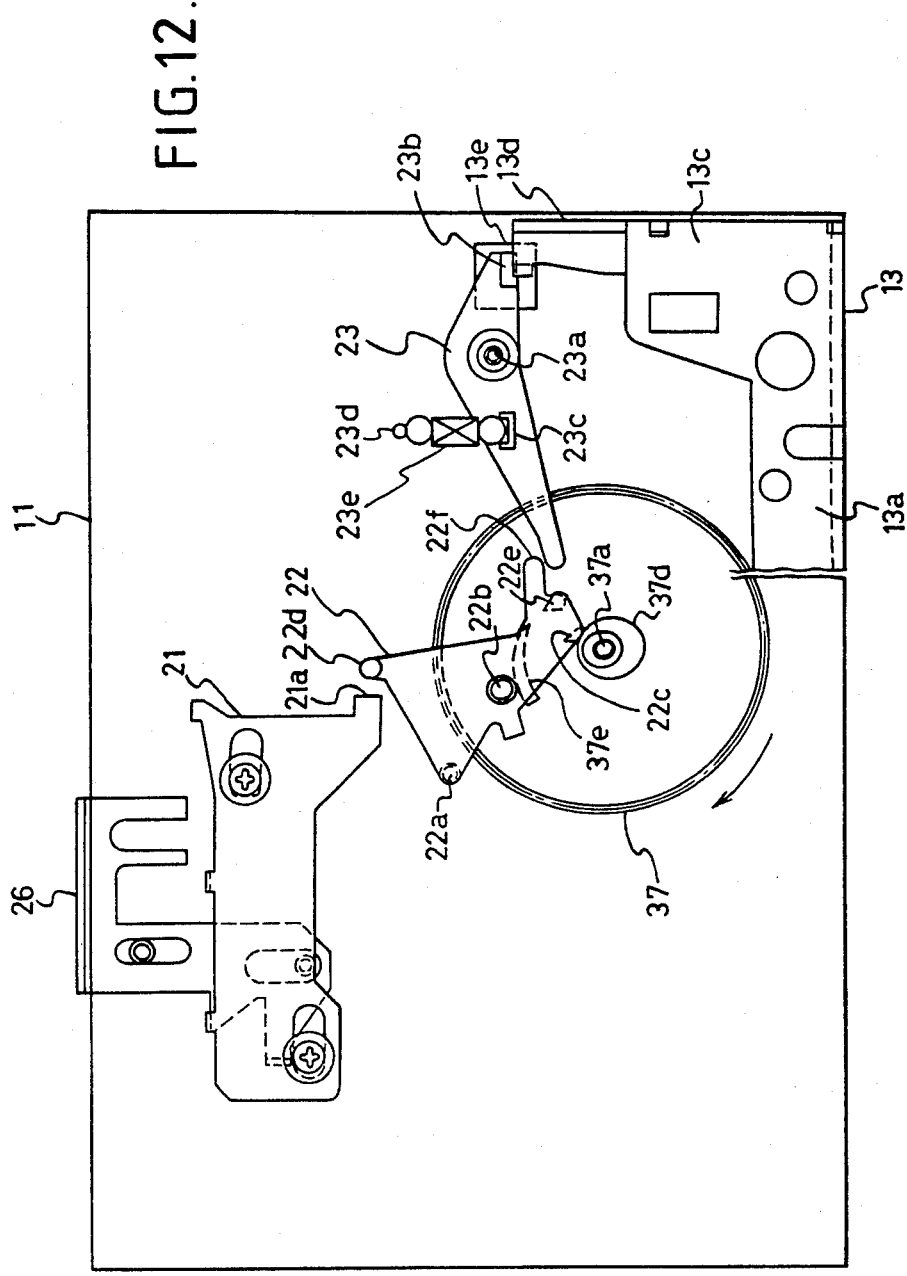

TAPE PLAYER

BACKGROUND OF THE INVENTION

This invention relates to a tape player, and more particularly, to a tape player for playing cartridge type tapes which utilizes a particularly simple and reliable mechanism.

Small sized, lightweight, and thus portable, tape players have recently become popular, particularly ones which operate in stereo. Thus, the user can carry one in his pocket and enjoy listening to tapes while wearing headphones. Such portable tape players are continuously being reduced in size and weight. At present, they are about the same size as the cartridge case which holds the tape cartridge.

When a tape player is miniaturized, it is particularly important that the construction of the tape player is simplified but its operability and convenience is not reduced.

Some portable tape players have been reduced in size and weight but are not as easily operable nor as conveniently used. For example, they often fail to have mechanisms for easy operation of the tapes like a full automatic tape stop detection mechanism. Other portable tape players have such mechanisms for easy operation but are not sufficiently reduced in size and weight.

SUMMARY OF THE INVENTION

It is, therefore, an object of the present invention to provide a tape player which is of simple construction.

Another object of the present invention is to provide a tape player with improved operability.

A further object of the present invention is to provide a tape player with improved reliability.

According to one aspect of the present invention, the tape player includes a rotating body for driving which has a cam part and an engaging part and which rotates while unconnected with the running of the tape; a rotating body for high speed and a rotating body for normal speed, which are mounted on the same spindle in such a way that they can rotate in a given direction together with the rotating body for driving; a first rotational drive transmission mechanism which, when the control members for operating high-speed running of the tape are in the operating state, transmits the rotational drive of the rotating body for high speed to the spindle of the reel which constitutes the take-up side during high-speed running of the tape; a second rotational drive transmission mechanism which, when the control members for operating normal-speed running of the tape are in the operating state, transmits the rotational drive of the rotating body for normal speed to the spindle of the reel which constitutes the take-up side during normal-speed running of the tape; a bias force member, which is mounted on the same spindle as the rotating body for high speed and rotating body for normal speed, and which receives energizing force as it is engaged with the rotating body for high speed and rotating body for normal speed; and a detection member, which is energized in one direction by the bias force member, and changes its position as it follows the cam part of the rotating body for driving, and engages, when the running of the tape is stopped, with the engaging part of the rotating body for driving.

Additional objects and advantages of the present invention will become apparent to persons skilled in the art from the following detailed description and the accompanying drawings, of which:

BRIEF DESCRIPTION OF THE DRAWINGS

FIG. 12 is a plan view of the relation between the cassette holder and the ASO mechanism;

DESCRIPTION OF THE PREFERRED EMBODIMENT

The present invention will be described in detail with reference to the accompanying drawings. Throughout the drawings, like reference letters and numerals will be used to designate like or equivalent elements.

Figure 1:
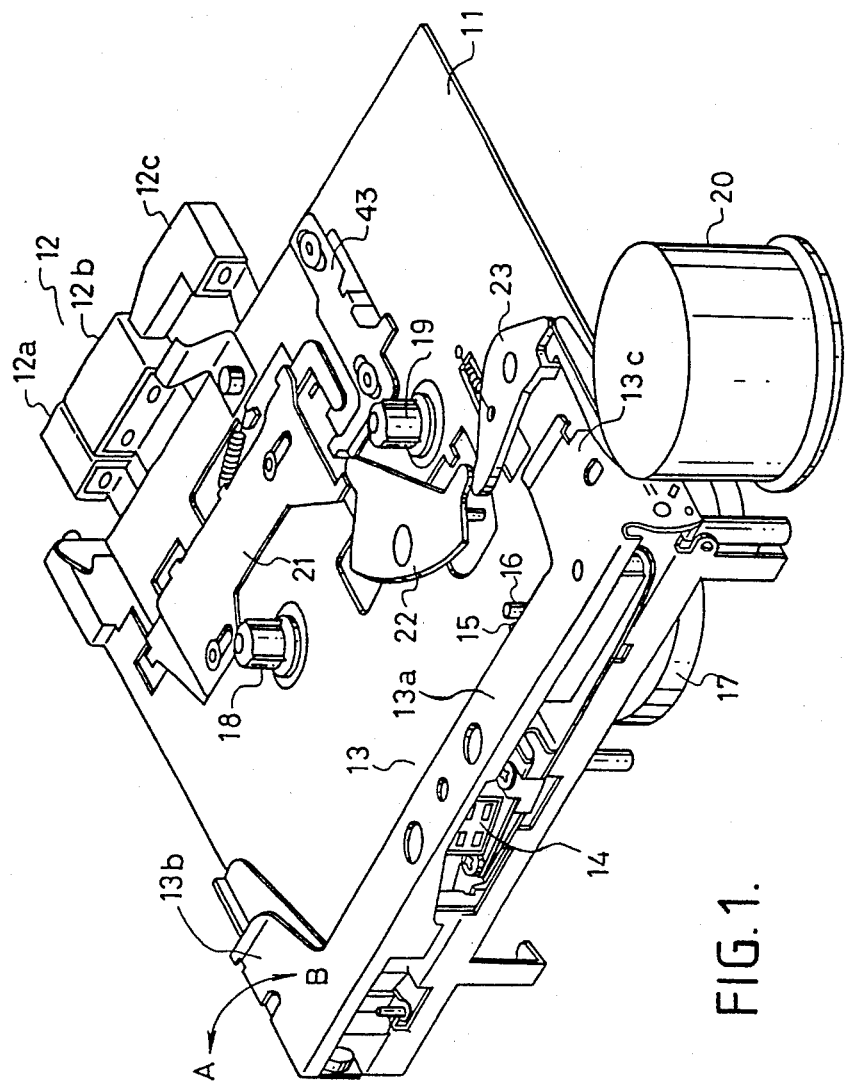
FIG. 1 is an oblique view of an embodiment of the tape player of this invention.

FIG. 1 shows an oblique view of a tape player, for example, a compact cassette tape player, to which this invention has been applied. Main chassis 11 is formed of an approximately square-shaped metal plate. Operating section 12, for putting the compact cassette tape (not shown) into the desired running or stopped state, is provided at one edge of main chassis 11. Operating section 12 consists of record operating button 12a, playback operating button 12b, stop operating button 12c, and (not shown in FIG. 1) rewind, fast forward and pause operating buttons.

Main chassis 11 is further provided, on the edge opposite to that on which operating section 12 is placed, with cassette holder 13 which holds the cassette tape which is loaded into it. Cassette holder 13 consists of base 13a which is arranged parallel to main chassis 11 and a pair of retaining parts 13b, 13c, provided at the two ends of base 13a, which clasp the two ends of the cassette tape in the thickness direction. Cassette holder 13 has a cassette cover (not shown). The cassette holder 13 is pivotally attached to main chassis 11 at each end in such a way that it can swing in the directions indicated by arrows A, B in FIG. 1.

When cassette holder 13 is swung up, in the direction of arrow A in FIG. 1, it is in the "open" position, for the insertion or removal of the cassette tape; when it is swung down, in the direction of arrow B, it is in the "closed" position, used when the cassette tape is running. Cassette holder 13 clicks into both the open and the closed positions, so that it is stable in these positions.

Recording and playback head 14 (referred to below as record/playback head) is provided approximately at the middle of base 13a of cassette holder 13. Pinch roller 15 and an erasure head (not shown in FIG. 1) are provided respectively on the parts of base 13a on either side of record/playback head 14. The cassette tape is inserted into cassette holder 13 in such a way that the side which has apertures fits over record/playback head 14 and pinch roller 15. Record/playback head 14, pinch roller 15 and the erasure head swing up and down with cassette holder 13 when it is opened and closed.

Capstan 16 is provided on a part of main chassis 11 so that it faces pinch roller 15. On the underside of main chassis 11, capstan 16 constitutes the spindle of flywheel 17, and rotates integrally with it.

At approximately the central part of main chassis 11 a pair of reel platforms 18, 19 are supported in such a way that they are free to rotate about their axes. Motor 20 which supplies rotational driving force to flywheel 17, and which therefore, by causing reel platforms 18, 19 to rotate, puts the cassette tape into the desired running state, is fitted at the side of main chassis 11.

Latch slider 21, automatic shut-off detection (referred to as ASO lever below) lever 22, cassette holder open/shut detection lever 23 and gear control slider 43, all of which will be described in detail later, are supported on the surface of main chassis 11.

Figure 2:
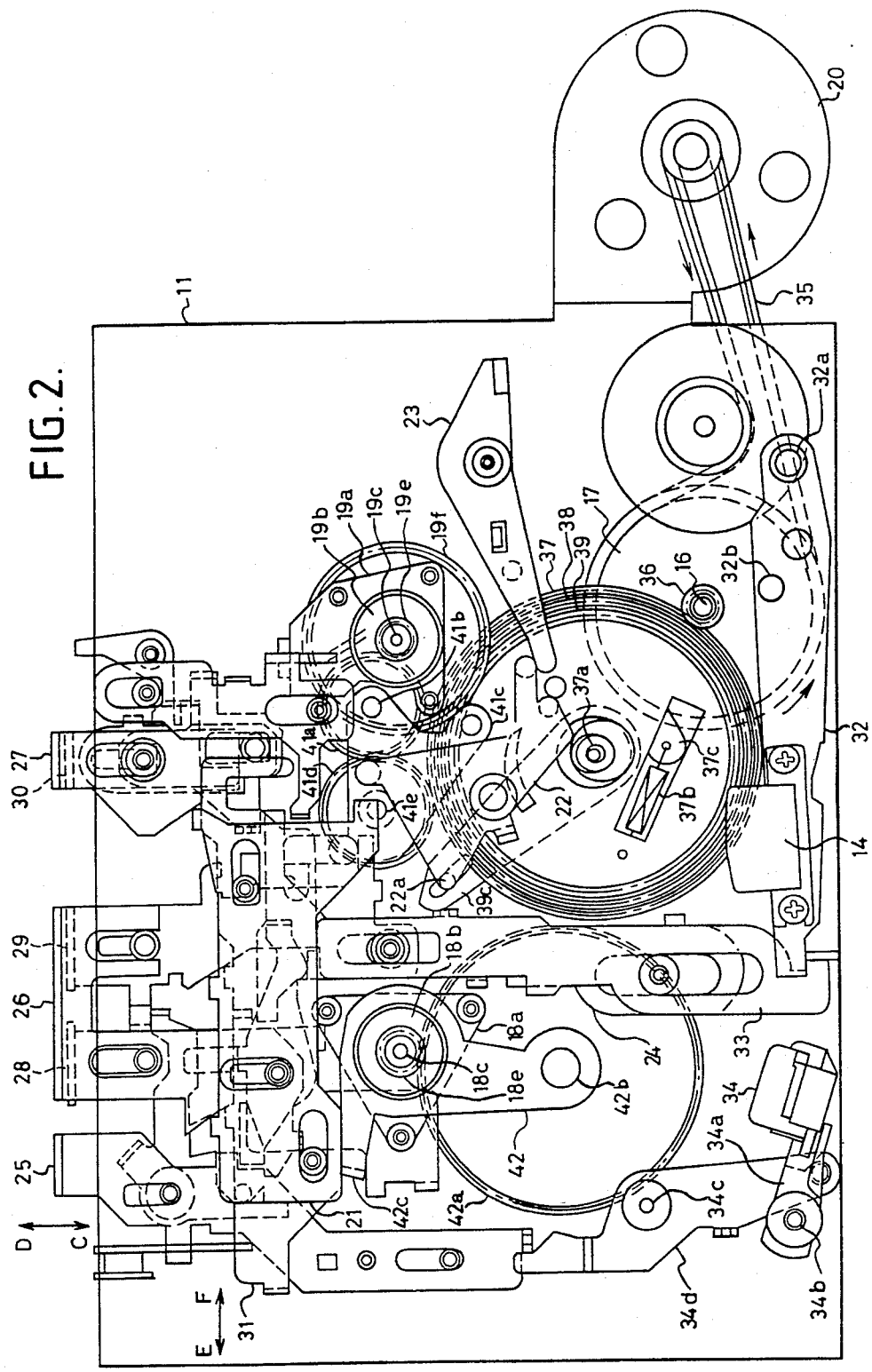
FIG. 2 is a plan view showing the overall construction of this embodiment.

FIG. 2 shows in detail the mechanism of the tape player depicted in FIG. 1. Record operating slider 25, playback operating slider 26 and stop operating slider 27, to which record operating button 12a, playback operating button 12b and stop operating button 12c are respectively fitted, are slidably mounted on main chassis 11 in the directions of arrows C, D in the drawing. Rewind operating slider 28 and fast forward operating slider 29 are provided alongside playback operating slider 26, and pause operating slider 30 alongside stop operating slider 27. Buttons (not shown in FIG. 2) are fitted to rewind, fast forward and pause operating sliders 28, 29 and 30. These operating sliders 25 to 30 are supported on the main chassis 11 in such a way that they can be depressed in the direction of arrow C in FIG. 2, and can be returned in the direction of arrow D by means of spring force (not shown). Latch slider 21 is mounted approximately at right angles to operating sliders 25 to 30. Latch slider 21 is supported on main chassis 11 in such a way that it can slide in the directions of arrows E, F in the drawing. Latch slider 21 engages with operating sliders 25, 26, 28, 29 which put the cassette tape in the desired running state, and latches them in their respective operating positions in the conventional manner. Stop operating slider 27, when depressed, engages with latch slider 21, but is not latched in the depressed position; by sliding latch slider 21 in the direction of arrow E, it functions to release the catch on operating sliders 25, 26, 28, 29 which were previously latched in the depressed position. When pushed once, pause operating slider 30, provided with a conventional push-push mechanism, and independent of latch slider 21, temporarily stops the running of the tape in recording or playback operation; when pushed a second time, the push-push latch is released, and record or playback running of the tape is restarted.

Switch slider 31 is provided on main chassis 11, aligned with latch slider 21. Switch slider 31 is supported on main chassis 11 in such a way that it can move in the directions of arrows E, F in the drawing. Switch slider 31 is biased in the direction of arrow F by a spring (not shown), and is coupled to playback, rewind and fast forward operating sliders 26, 28, 29, so that when any one of them is depressed switch slider 31 slides in the direction of arrow E in the drawing. When switch slider 31 slides in the direction of arrow E, it switches on a power source leaf switch (not shown), which supplies power to or cuts it off from motor 20. The rotational drive of motor 20 is thereby linked to the operation of the playback, rewind and fast forward operating sliders 26, 28, 29.

Record/playback head 14 is fitted to one end of head carrying plate 32, in such a way that record/playback head 14 is free to turn around spindle 32a mounted on base 13a of cassette holder 13. Head carrying plate 32 is turned counterclockwise when cassette holder 13 is open, and record/playback head 14 is not in contact with the cassette tape even when the cassette tape is inserted into cassette holder 13. As cassette holder 13 is closed, head carrying plate 32 turns gradually clockwise and when cassette holder 13 is in the fully closed position, record/playback head 14 is brought into contact with the cassette tape. The mechanism is such, however, that although cassette holder 13 is in the fully closed position, head carrying plate 32 is turned counterclockwise by the action of fast speed slider 24 and head carrying plate control lever 33 which is coupled to fast speed slider 24, when rewind operating slider 28 or fast forward operating slider 29 is depressed.

Pinch roller 15, though not shown in FIG. 2, is supported in such a way that it is free to rotate around spindle 32b mounted on head carrying plate 32, and is brought into contact with or separated from capstan 16 by the clockwise or counterclockwise movement already described of head carrying plate 32.

Erasure head 34, which utilizes a permanent magnet, is mounted at one end of erasure head carrying plate 34a. Erasure head carrying plate 34a is supported, in such a way that its other end is free to turn around spindle 34b mounted on base 13a of cassette holder 13. When cassette holder 13 is closed, the erasure head carrying plate 34a engages with one end of erasure head control lever 34d, which is supported by means of spindle 34c mounted on main chassis 11 in such a way that erasure head control lever 34d is free to turn, while the other end of erasure head control lever 34d engages with record operating slider 25. When record operating slider 25 is in the released position, erasure head carrying plate 34a is turned clockwise so that erasure head 34 does not come into contact with the cassette tape. When record selector 25 is depressed in the direction of arrow C erasure head control lever 34d turns counterclockwise; as this happens, erasure head carrying plate 34a also turns counterclockwise and erasure head 34 is brought into contact with the cassette tape. Thus, when recording, erasure head 34 and record/playback head 14 are brought into contact with the cassette tape, and motor 20 is activated by the depressing of record operating slider 25 and playback operating slider 26.

Motor 20 and flywheel 17 are linked by belt 35 in such a way that rotational drive can be transmitted. Capstan 16, which rotates integrally with flywheel 17, is provided with capstan pinion 36, which shares the same spindle as and rotates integrally with capstan 16. Capstan pinion 36 is permanently engaged with drive gear 37 which is supported in such a way that it is free to rotate around spindle 37a mounted on main chassis 11.

Figure 3:
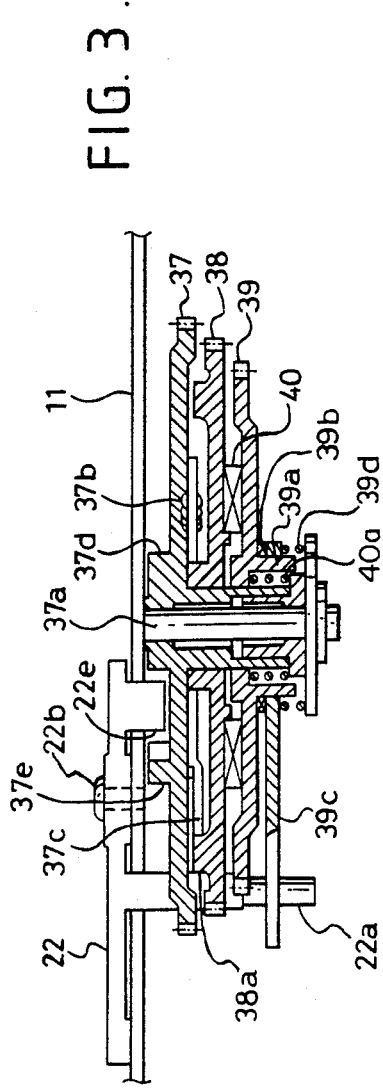
FIG. 3 is a lateral section showing details of the tape drive force transmission gear assembly of the embodiment.

Referring now to FIG. 3 which shows a transmission gear section, drive gear 37 is provided with fast speed gear 38 of smaller diameter than drive gear 37, and normal speed gear 39 of smaller diameter than fast speed gear 38, both concentric with drive gear 37. One end of coil spring 37b is attached to drive gear 37 while the other end is attached to one end of torque limiter lever 37c (this is described in detail below). The other end of torque limiter lever 37c is engaged with projecting part 38a formed on one side of fast speed gear 38. When drive gear 37 rotates, fast speed gear 38 is rotated by drive gear 37 via spring 37b, torque limiter lever 37c and projecting part 38a, in the same direction as drive gear 37.

An approximately ring-shaped friction member 40 is interposed between fast speed gear 38 and normal speed gear 39. Normal speed gear 39 is thrust upwards by coil spring 40a mounted concentrically with spindle 37a, and is pressed into contact with fast speed gear 38 via friction member 40. Thus, when fast speed gear 38 is rotated in the manner described earlier, normal speed gear 39 also rotates in the same direction.

Cylindrical part 39a, concentric with spindle 37a, projects downward from the center part of normal speed gear 39. One end of bias lever 39c, together with ring-shaped friction member 39b, is loosely fitted around cylindrical part 39a. Bias lever 39c is thrust upwards by the coil spring 39d, and is pressed via friction member 39b into contact with normal speed gear 39. Thus, when normal speed gear 39 is rotating, bias lever 39c is subjected to torque in the direction of rotation of normal speed gear 39. The other end of bias lever 39c engages with projecting part 22a which extends below main chassis 11 in FIG. 3, from the automatic shut off detection lever 22. A detailed explanation of ASO lever 22 and bias lever 39c will be given later.

Figure 4:
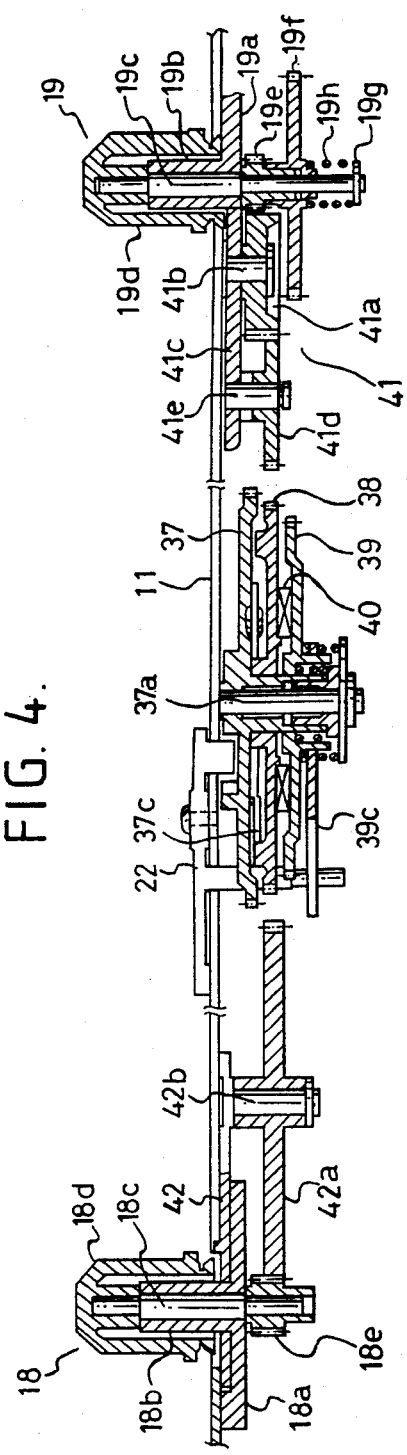
FIG. 4 is a composite lateral section taken through FIG. 2.

An explanation follows of reel platforms 18, 19 with reference to FIG. 4. Reel platform 19 acts as the take-up side for the cassette tape during recording and playback. Bearing 19b, cylindrical in shape and having flange 19a at its lower end is fixed on main chassis 11 through flange 19a. Reel spindle 19c passes through bearing 19b in such a way that reel spindle 19c is free to rotate. Reel cap 19b is fitted to the upper part of reel spindle 19c in the drawing, while fast speed pinion 19e and normal speed gear 19f of a larger diameter than fast speed pinion 19e are provided concentrically on the lower part of reel spindle 19c. Reel cap 19d, fast speed pinion 19e and normal speed gear 19f all rotate integrally with reel spindle 19c.

Fast speed pinion 19e is fixed to reel spindle 19c, but normal speed gear 19f is supported in such a way that it can slide axially on reel spindle 19c, i.e., in the up and down direction in the drawing. Normal speed gear 19f is normally thrust upwards in the drawing by coil spring 19h which is interposed between normal speed gear 19f and spring shoe 19g mounted on the bottom end of reel spindle 19c in the drawing, and is thus brought into contact with fast speed pinion 19e.

When normal speed gear 19f is thrust upwards by spring 19h, normal speed gear 19f meshes with normal speed gear 39 in the transmission gear section. In FIG. 4, normal speed gear 19f in reel platform 19 and normal speed gear 39 in the transmission gear section are shown as if separated; but they have been depicted in this manner only for convenience in the drawing, and in fact they mesh together as shown in FIG. 2 which depicts the "stopped" state.

When, in this stopped state, playback operating slider 26, for example, is depressed, then, as described above, switch slider 31 is slid in the direction of arrow E in FIG. 2, the power source leaf switch is switched on, and motor 20 rotates counterclockwise in FIG. 2. The rotational drive of motor 20 is then transmitted, via belt 35, flywheel 17, capstan pinion 36, drive gear 37, fast speed gear 38, normal speed gear 39 in the transmission gear section and normal speed gear 19f in reel platform 19, to reel spindle 19c. Reel spindle 19c rotates counterclockwise in FIG. 2, and reel cap 19d rotates in the same direction, thus effecting take-up of the tape in the cassette tape. Also, record/playback head 14 is brought into contact with the cassette tape as described earlier, pinch roller 15 being pressed against capstan 16 with the cassette tape between, and the cassette tape is then running in the playback state.

When the tape player is in the stopped state and record operating slider 25 and playback operating slider 26 are depressed together, erasure head 34 is brought into contact with the cassette tape (in all other respects, the operation of the mechanism is as explained for the playback state described above) and the cassette tape is running in the record state.

Fast speed pinion 19e mounted on reel spindle 19c is permanently meshed with first gear 41a in fast forward drive transmission gear section 41, which is supported in such a way that first gear 41a is free to rotate around spindle 41b mounted on main chassis 11 as shown once again in FIG. 4. On spindle 41b there is also mounted fast forward lever 41c in such a way that it is free to turn around spindle 41b. Fast forward lever 41c carries second gear 41d in fast forward drive transmission gear section 41. Second gear 41d is rotatably held on spindle 41e mounted on fast forward lever 41c and is permanently meshed with first gear 41a. Second gear 41d is so arranged that it can mesh with the fast speed gear 38 in the transmission gear section.

Figure 5:
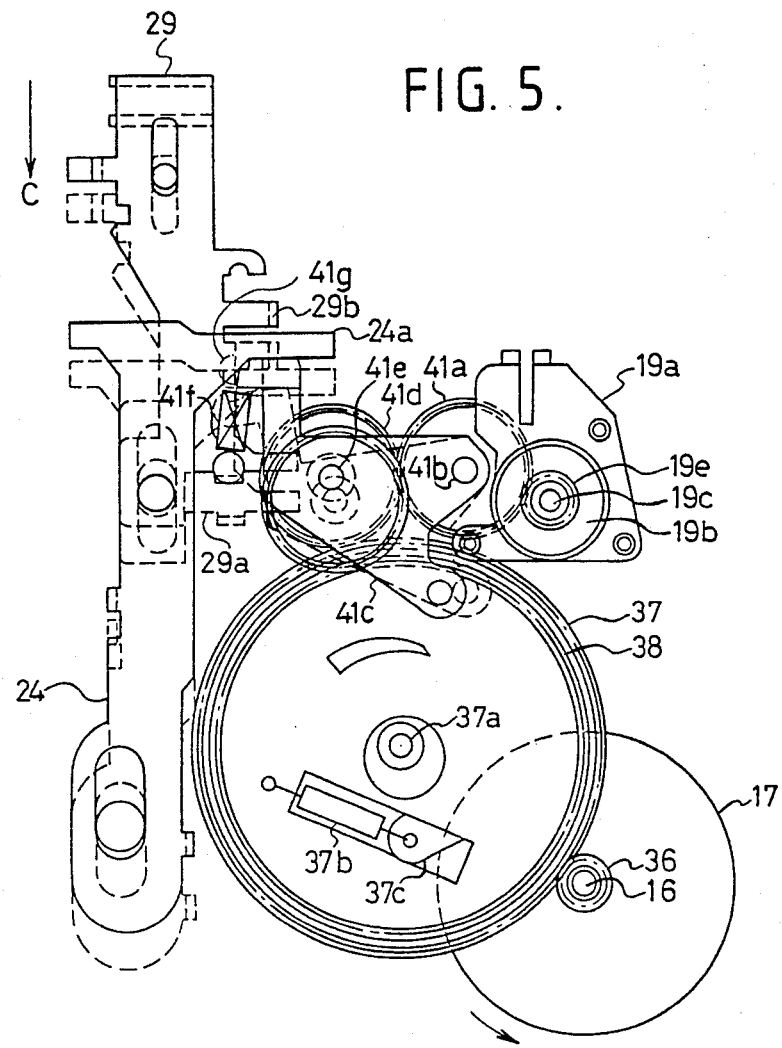
FIGS. 5 and 6 are plan views showing, respectively the working of the fast forward and rewind states.

FIG. 5 provides a plan view of fast forward drive transmission gear section 41. The movement of fast forward operating slider 29 is coupled to fast forward lever 41c by means of coil spring 41f which is fitted between hook part 41g formed on the left end of fast forward lever 41c and hook part 29a formed on the bottom end of fast forward operating slider 29.

In the state in which fast forward operating slider 29 is in the released position indicated by the solid lines in FIG. 5, fast forward lever 41c is also in the position indicated by the solid lines in the drawing, having moved clockwise. When fast forward lever 41c is in the position indicated by the solid lines in the drawing, second gear 41d is not engaged with fast speed gear 38 in the transmission gear section. This being the case, when, in the record or playback states already described, and in the rewind state, which will be described later, reel spindle 19c rotates counterclockwise (clockwise during rewinding), first and second gears 41a and 41d rotate without engaging any other gears.

When, in the stopped state which was described earlier, fast forward operating slider 29 is depressed in the direction of arrow C in the drawing, fast forward operating slider 29 is latched by latch slider 21 in the position indicated by the dotted lines in the drawing. As this is done, fast forward lever 41c, which is coupled to fast forward operating slider 29, rocks counterclockwise about spindle 41b. This counterclockwise rocking of fast forward lever 41c continues until it reaches the position where second gear 41d meshes with fast speed gear 38 in the position indicated by the dotted lines in the drawing.

When second gear 41d meshes in this way with fast speed gear 38, the flywheel 17, which is driven by the output drive of motor 20, rotates counterclockwise as shown in FIG. 5, transmits rotational force via capstan pinion 36, drive gear 37, fast speed gear 38, second gear 41d, first gear 41a and fast speed pinion 19e, to reel spindle 19c, and reel spindle 19c rotates counterclockwise at high speed. Further, when fast forward operating slider 29 is depressed, projecting part 29b formed on one side of fast forward operating slider 29 presses against engaging part 24a formed on the rear end part of fast speed slider 24. Because of this, fast speed slider 24 moves as fast forward operating slider 29 is depressed from the position indicated by the solid line to the position indicated by the dotted line in the drawing. The movement of fast speed slider 24 serves not only to rock head carrying plate 32 via head carrying plate control lever 33 (see FIG. 2) counterclockwise as shown in FIG. 2, as already described, and thus to detach record/playback head 14 and pinch roller 15 from the cassette tape, but also (as will be described in greater detail later) to slide normal speed gear 19f of reel platform 19 downwards in FIG. 4, compressing spring 19h, and thus to disengage normal speed gear 19f from normal speed gear 39 in the transmission gear section. Thus reel spindle 19c rotates counterclockwise in FIG. 5 at high speed, as already described, and reel cap 19d also rotates in the same direction, so that the cassette tape is running in the fast forward state.

An explanation follows with regard to reel platform 18, which acts as the take-up side for the cassette tape during rewinding. As illustrated once again in FIG. 4, bearing 18b, cylindrical in shape and having flange 18a at its lower end as shown in FIG. 4, is fixed to main chassis 11 through flange 18a. Reel spindle 18c passes through bearing 18b in such a way that it is free to rotate. Reel cap 18d is fitted to the upper part of reel spindle 18c in the drawing, while fast speed pinion 18e is provided on the lower part of reel spindle 18c. Reel cap 18d and fast speed pinion 18e both rotate integrally with reel spindle 18c.

Rewind lever 42 is rockably mounted on main chassis 11 concentric with reel platform 18. On the bottom end of rewind lever 42 in the drawing rewind gear 42a is rotatably mounted through spindle 42b permanently meshed with fast speed pinion 18e. The arrangement is such that rewind gear 42a can mesh with fast speed gear 38 in the transmission gear section.

Figure 6:
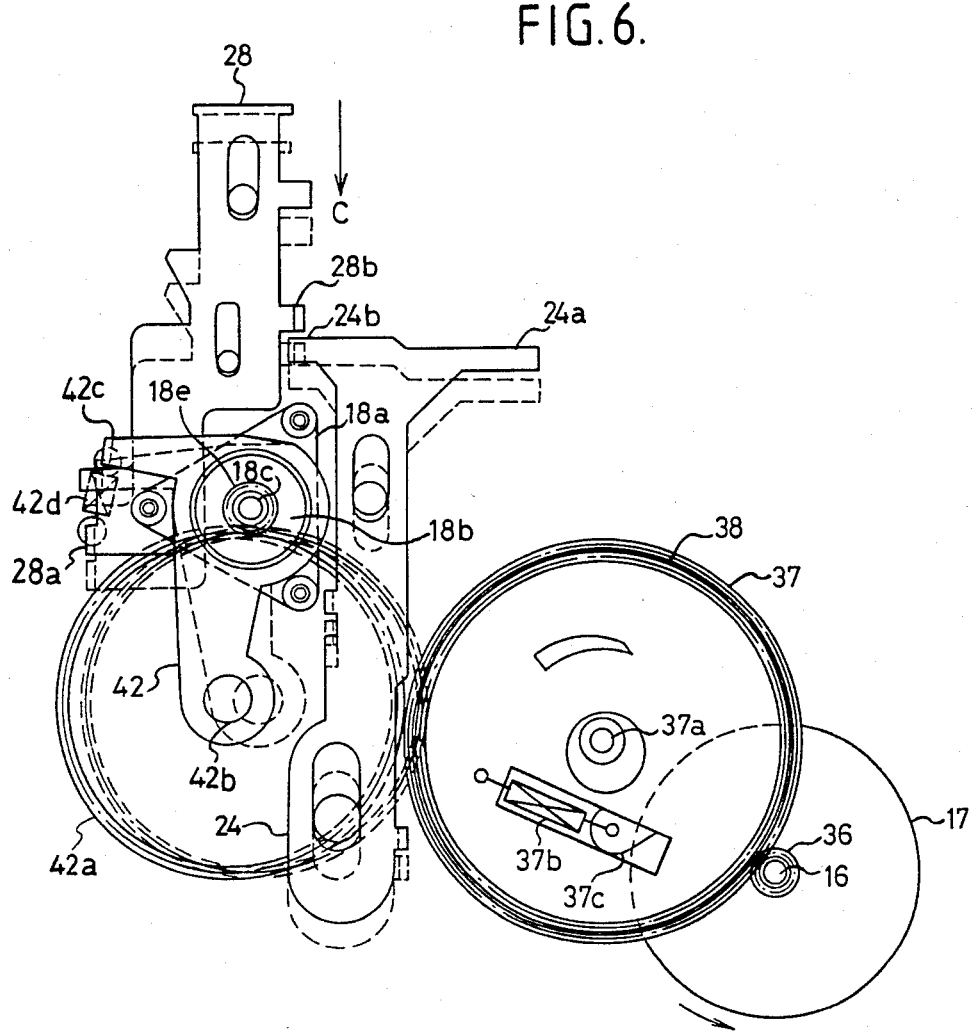

FIG. 6 provides a plan view of rewind lever 42 and rewind gear 42a. The movement of rewind operating slider 28 is coupled to rewind lever 42 by means of coil spring 42d which is fitted between hook part 42c formed on the left end of rewind lever 42 in the drawing and hook part 28a formed on the bottom end of rewind operating slider 28 in the drawing.

In the state in which rewind operating slider 28 is in the released position indicated by the solid lines in FIG. 6, rewind lever 42 is also in the position indicated by the solid line in the drawing, having been rocked clockwise in the drawing. When rewind lever 42 is in the position indicated by the solid line in the drawing, rewind gear 42a is disengaged from fast speed gear 38 in the transmission gear section. This being the case, when, in the record or playback state and the fast forward state already described, reel spindle 18c rotates counterclockwise, and rewind gear 42a rotates without engagement.

When, in the stopped state which was described earlier, rewind operating slider 28 is depressed in the direction of arrow C as shown in FIG. 6, rewind operating slider 28 is latched by latch slider 21 in the position indicated by the dotted line in the drawing. As this is done, rewind lever 42, which is coupled to rewind operating slider 28, rocks counterclockwise about bearing 18b. This counterclockwise rocking of rewind lever 42 continues until it reaches the position where rewind gear 42a meshes with fast speed gear 38 in the position indicated by the dotted line in the drawing.

When rewind gear 42a meshes in this way with fast speed gear 38, the flywheel 17, driven by motor 20, rotates counterclockwise transmitting rotational force via capstan pinion 36, drive gear 37, fast speed gear 38, rewind gear 42a and fast speed pinion 18e, to reel spindle 18c causing it to rotate clockwise at high speed. Further, when rewind operating slider 28 is depressed, projecting part 28b formed on one side of rewind operating slider 28 presses against engaging part 24b formed on the rear end part of fast speed slider 24. Because of this, fast speed slider 24 moves as rewind operating slider 28 is depressed from the position indicated by the solid line in the drawing to the position indicated by the dotted line. As already described, head carrying plate 32 is rocked via head carrying plate control lever 33, counterclockwise record/playback head 14 and pinch roller 15 are detached from the cassette tape, and additionally normal speed gear 19f of reel platform 19, compressing spring 19h, is slid downwards as shown in FIG. 4, and disengaged from normal speed gear 39. Reel spindle 18c rotates clockwise at high speed, and reel cap 18d also rotates in the same direction, as already described, so that the cassette tape runs in the rewind state.

In each of the operating modes, playback, record, fast forward and rewind explained above, when stop selector 27 is depressed, the latch on record, playback, rewind and fast forward operating sliders 25, 26, 28, 29, which were previously latched in the depressed position by latch slider 21, is released, and all of these operating sliders 25, 26, 28, 29 return to their respective released positions. Because of this, switch slider 31 also returns in the direction of arrow F as shown in FIG. 2, the power source leaf switch is switched off, and the rotation of motor 20 is stopped. The mechanism reverts to the "stopped" state previously described, and the running of the tape is halted. When the mechanism is moved to the stopped state from the fast forward or rewind mode, since high speed slider 24 moves upwards (FIGS. 5 and 6), normal speed gear 19f of reel platform 19 is slid upwards (FIG. 4) by the thrust of spring 19h and meshes with normal speed gear 39.

When high speed slider 24 is moved in the direction of arrow C (FIGS. 5 and 6), normal speed gear 19f of reel platform 19 is slid downwards (FIG. 4), compressing spring 19h and disengaging from normal speed gear 39. This operation will be explained in detail now. (Since this operation is associated with stop operating slider 27 and pause operating slider 30, they also will be explained.)

Figure 7:
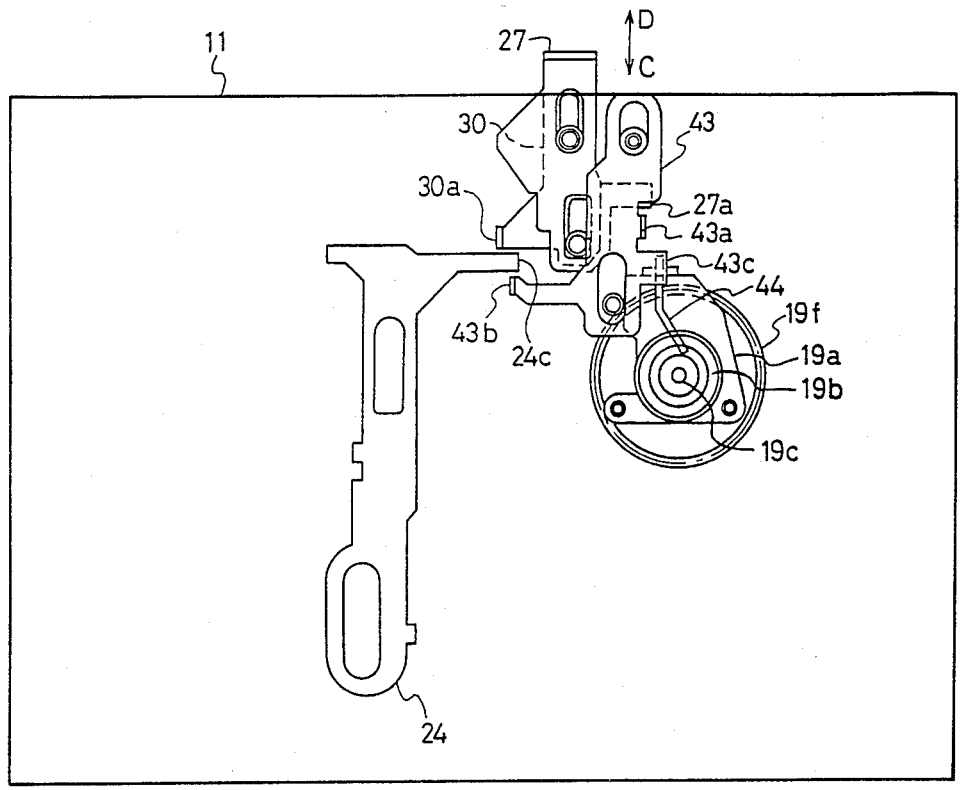
FIGS. 7 and 8 are, respectively, a plan view and a lateral section showing the relation between the stop and pause operating sliders and normal speed gears.

As shown in FIG. 7, projecting piece 27a is formed on one side of stop operating slider 27. Projecting piece 27a is positioned above catch 43a formed on one side of gear control slider 43 which is supported on main chassis 11 in such a way that it is free to move in the direction of arrows C and D in the drawing. Gear control slider 43 is biased in the direction of arrow D by a spring (not shown).

Figure 8:
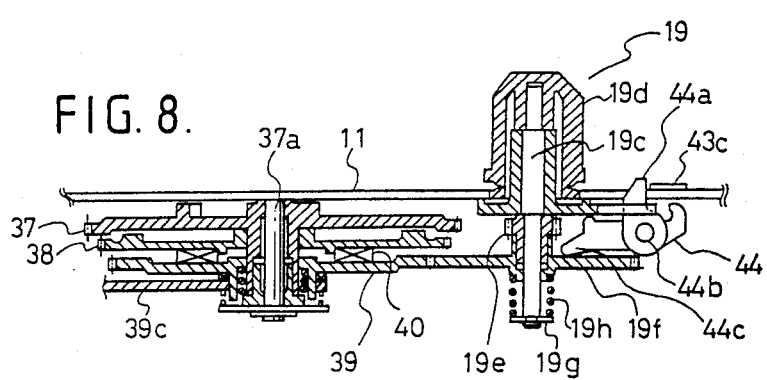

Projecting piece 30a is formed on one side of pause operating slider 30 as shown in FIG. 7. Projection piece 30a is positioned above engaging part 24c formed on the rear end of fast speed slider 24. Engaging part 24c of fast speed slider 24 is positioned above catch 43b which extends from what is the lower part of gear control slider 43. Drive piece 43c is placed so that it faces one end 44a of gear control lever 44 which, in side view, is shaped something like a letter L, as shown in FIG. 8; and gear control lever 44 is supported, in such a way that it is free to rock about spindle 44b of which a part is angled for fixing to main chassis 11. The other end 44c of gear control lever 44 is in contact with the upper surface (FIG. 8) of normal speed gear 19f of reel platform 19.

Assuming now that the tape player is in the playback state previously described, we assume further that stop operating slider 27 has been depressed. Projecting piece 27a of stop operating slider 27 then makes contact with catch 43a of gear control slider 43, and presses catch 43a downwards in FIG. 9(a). Because of this, control slider 43 slides downwards and drive piece 43c is brought into contact with one end 44a of gear control lever 44 as shown in FIG. 9(b) and presses end 44a to the left. By this means gear control lever 44 is rocked counterclockwise, its other end 44c slides normal speed gear 19f downwards in FIG. 9(b), compressing spring 19h, and normal speed gear 19f is disengaged from normal speed gear 39. When pressure on stop operating slider 27 is removed, since stop operating slider 27 is returned upwards in FIG. 9(a), gear control slider 43 also returns in the same direction; and by this means normal speed gear 19f is slid upwards in FIG. 9(b) by the thrust of spring 19h, to mesh with normal speed gear 39.

The mechanism by which, as a result of depressing stop operating slider 27, normal speed gear 19f is disengaged from normal speed gear 39 operates in the same way when the tape player is initially in the record state.

Figure 10A:
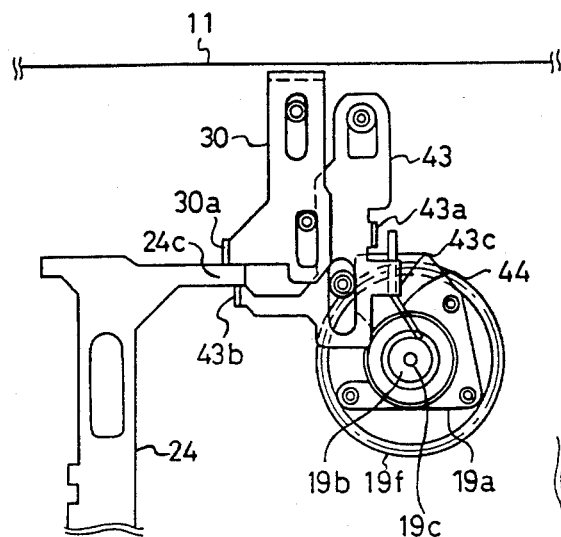
FIGS. 10(a) and 10(b) are, respectively, a plan view and a lateral section showing the working of the pause operating slider and the normal speed gears.

Supposing now that the tape player is in the playback mode, we assume that pause operating slider 30 has been depressed as shown in FIG. 10(a). Pause operating slider 30 is then latched in the depressed position indicated in the drawing by a push-push mechanism (not shown), as mentioned earlier. Projecting piece 30a on pause operating slider 30 presses engaging part 24c of fast speed slider 24 downwards, so that just as when fast forward and rewind operating sliders 28, 29 are depressed, fast speed slider 24 is slid downwards in the drawing. Therefore, engaging part 24c of fast speed slider 24 presses catch 43b of gear control slider 43 downwards, so that gear control slider 43 slides downwards.

Figure 10B:
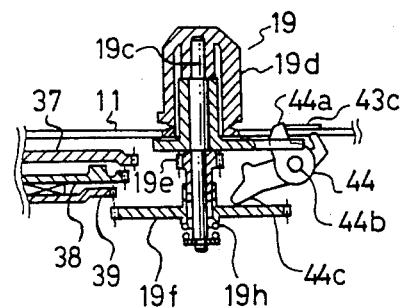

By this means, gear control lever 44 is rocked counterclockwise in FIG. 10(b), and normal speed gear 19f is slid downwards and disengaged from normal speed gear 39. Therefore, normal speed gear 39 ceases to drive reel spindle 19c via normal speed gear 19f, and the running of the cassette tape in the playback mode is temporarily stopped.

When pause operating slider 30 is depressed a second time, being already in the depressed position shown in FIG. 10(a), it returns upwards, and as this takes place fast speed slider 24 and gear control slider 34 also return in the same direction. Therefore, normal speed gear 19f meshes with normal speed gear 39, and the cassette tape is again placed in the running mode.

As will be clear from the above explanation, fast speed slider 24 slides downwards (FIG. 10(a)) whenever fast forward, rewind and pause operating sliders 29, 28, 30 are depressed, and functions, via gear control slider 43 and gear control lever 44, to disengage normal speed gear 19f from normal speed gear 39.

Pause mechanism described above operates in the same way when the tape player is in the record mode.

Figure 9A:
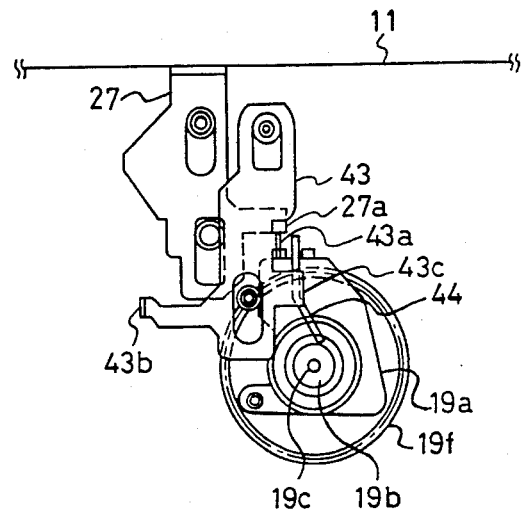
FIGS. 9(a) and 9(b) are, respectively, a plan view and a lateral section showing the working of the stop operating slider and the normal speed gears.
Figure 9B:
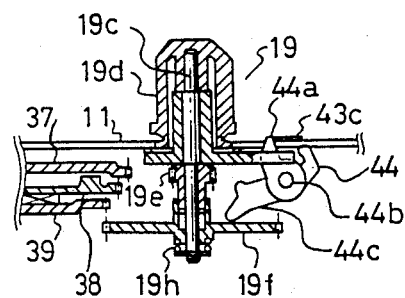

An explanation now follows of the way in which normal speed gear 19f is disengaged from normal speed gear 39 as a result of depression of stop operating slider 27 as shown in FIGS. 9(a) and 9(b). When stop operating slider 27 is depressed with the tape player in, for example, the playback state, playback operating slider 26 returns to the released state, the power source leaf switch is thereby switched off, the rotation of motor 20 ceases, and the running of the tape is stopped. Flywheel 17, however, continues to rotate for a short while owing to inertia, even when the power source leaf switch is off and the power supply to motor 20 has been turned off.

Since normal speed gear 39 rotates with the drive from flywheel 17, then, if normal speed gear 39 and normal speed gear 19f are meshed with each other when stop operating slider 27 is depressed, the inertial output drive of flywheel 17 would be transmitted to normal speed gear 19f. Therefore, reel spindle 19c would continue to rotate, to an extent corresponding to the inertia of flywheel 17, and the running of the tape would not be stopped at the moment of operation of stop operating slider 27, giving rise to the problem of tape run-on.

However, the transmission of the inertial output drive of flywheel 17 to normal speed gear 19f can be prevented as shown in FIGS. 9(a), 9(b). Normal speed gear 19f is disengaged from normal speed gear 39 as a result of the depressing of stop operating slider 27. Therefore, the running of the tape is stopped immediately after stop operating slider 27 is depressed, and tape run-on is prevented. This "prevention of run-on" effect is of course obtained in the same way by depressing stop operating slider 27 when the tape recorder is in the record state.

The tape player described above is provided with an automatic shut-off mechanism (ASO), which automatically stops the tape player when, in any of the various operating modes, the end of the tape is reached. An explanation follows of the ASO mechanism, referring to FIGS. 3 and 11. ASO lever 22 is rockably supported on spindle 22b mounted on main chassis 11. ASO lever 22 is engaged with bias lever 39c by means of projection 22a which projects downwards as shown in FIG. 3, and which fits freely into slot 39e formed at one end of bias lever 39c.

Engaging part 22c, which is in contact with the profile of eccentric cam 37d formed on the upper side of drive gear 37 (FIG. 3), is formed at the other end of ASO lever 22. Therefore, when drive gear 37 is rotated clockwise in FIG. 11 by drive from motor 20, and fast speed gear 38 and normal speed gear 39 rotate with it in the same direction, bias lever 39c is subjected to torque, also in the clockwise direction in FIG. 11. By this means, ASO lever 22 is also subjected to torque about spindle 22b in a clockwise direction, and its engaging part 22c is pressed into contact with the profile of eccentric cam 37d. Therefore, when fast speed gear 38 and normal speed gear 39 are rotating, ASO lever 22 oscillates about spindle 22b, following the profile of eccentric cam 37d.

Figure 11:
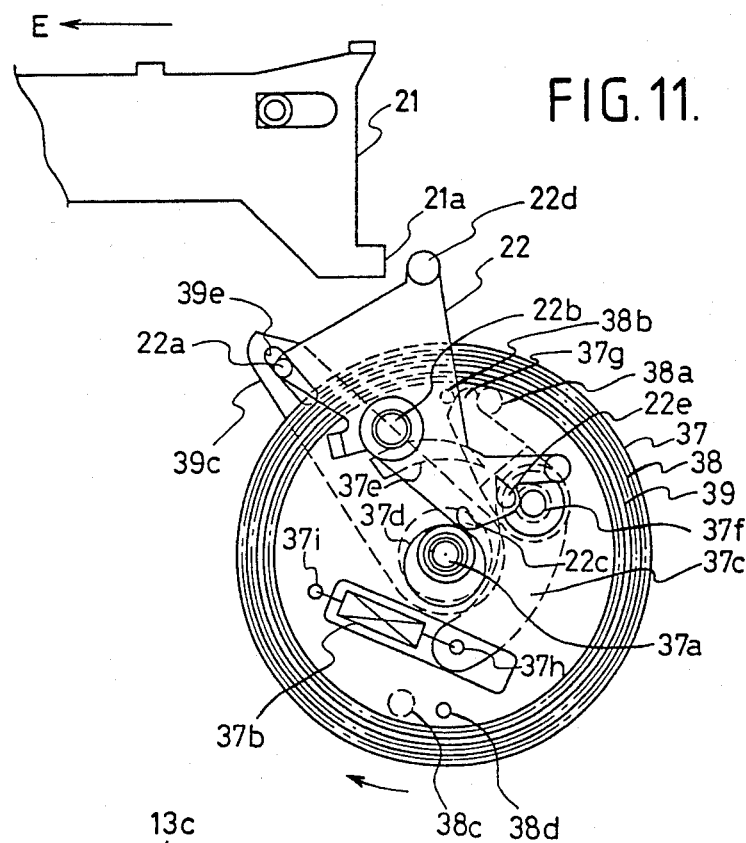
FIG. 11 is a plan view showing the automatic shut off (ASO) mechanism.

Projecting part 22d, which can engage with projecting piece 21a formed at one end of latch slider 21, is formed on the upper end of ASO lever 22 in FIG. 11. When ASO lever 22 is oscillating in the manner described above, projecting part 22d moves toward and away from projecting piece 21a of latch slider 21, but does not engage with it.

Further, drive take-up part 22e is formed on ASO lever 22 near engaging part 22c. Drive take-up part 22e can engage with curved drive part 37e of drive gear 37 formed on the upper side of drive gear 37 in FIG. 3; and when ASO lever 22 is oscillating in the manner described above, drive take-up part 22e is positioned on and cleared off the path of drive part 37e in FIG. 11 every time drive part 37e passes. The operation of ASO mechanism in the playback mode is explained first. When the tape player is in the playback mode, playback operating slider 26 is latched in the depressed position by latch slider 21, drive gear 37 is rotated clockwise (FIG. 11) by the drive from motor 20, and fast speed gear 38 and normal speed gear 39 rotate with it in the same direction. As reel spindle 19c is rotated via normal speed gear 19f, which is meshed with normal speed gear 39, ASO lever 22 starts its oscillating movement.

In this playback state, when the end of the tape is reached, the rotations of reel spindle 19c and normal speed gear 19f are arrested. Therefore, the rotation of normal speed gear 39, which meshed with normal speed gear 19f, is also stopped, and torque force in the clockwise direction ceases to be applied to bias lever 39c. As a result, engaging part 22c of ASO lever 22 ceases to be pressed into contact with the profile of eccentric cam 37d of drive gear 37.

Drive gear 37 continues to be rotated in the clockwise direction, however, by the transmission of drive from motor 20. When this happens, slip occurs at friction member 40 (see FIG. 3) between high speed gear 38 and normal speed gear 39. As a result, ASO lever 22 comes to rest and is left in the position it reaches when engaging part 22c is in contact with the maximum-radius part of the profile of eccentric cam 37d on drive gear 37, and thereafter no longer follows eccentric cam 37d. With ASO lever 22 left in this position, on the next revolution of drive gear 37 clockwise (FIG. 11), drive part 37e engages with drive take-up part 22e. In this case, drive take-up part 22e is aligned with the outer face of drive part 37e. As a result, by drive take-up part 22e engaging with the outside of drive part 37e of drive gear 37, ASO lever 22 is rocked further counterclockwise in FIG. 11 than the position in which it was previously left by the maximum-radius part of the profile of eccentric cam 37d.

When this happens, projecting part 22d of ASO lever 22 presses projecting piece 21a on latch slider 21, and slides latch slider 21 in the direction of arrow E in FIG. 11. As a result, the latch on playback operating slider 26, which had been latched by latch slider 21, is released, and playback operating slider 26 returns to the released state, the automatic shut-off (ASO) operation of the tape player being thus effected.

When the end of the tape is reached in the record state, the ASO operation is similarly effected. However, both record and playback operating sliders 25, 26 return to their released states when latch slider 21 slides in the direction of arrow E in FIG. 11.

Before proceeding to an explanation of the ASO operation in the fast forward and rewind states, an account is given next of torque limiter lever 37c. Torque limiter lever 37c is curved as shown in FIG. 11. It is rockably supported near its center on spindle 37f mounted on drive gear 37. Hook part 37g, formed on one end of torque limiter lever 37c, engages selectively with either pair of projecting parts 38a and 38b or 38c and 38d formed, symmetrically disposed about spindle 37a, on high speed gear 38. Torque limiter lever 37c is biased, in the direction in which its hook part 37g engages with projecting parts 38a and 38b or 38c and 38d, by spring 37b which is fitted between hole 37h formed at the other end of torque limiter lever 37c and hole 37i formed in drive gear 37.

We now assume that, in the state in which hook part 37g of torque limiter lever 37c is engaged with projecting parts 38a, 38b of fast speed gear 38 as shown in FIG. 11, drive gear 37 is being rotated clockwise in FIG. 11 by the drive from motor 20. Under these conditions the drive from drive gear 37 is transmitted via torque limiter lever 37c to fast speed gear 38, and then the drive from fast speed gear 38 is transmitted via friction member 40 to normal speed gear 39.

When drive gear 37, fast speed gear 38 and normal speed gear 39 are rotating as a unit, and a torque exceeding a prescribed overload is applied to normal speed gear 39, the rotation of normal speed gear 39 stops, but that of fast speed gear 38 continues (this is the state, described earlier, in which the end of the tape has been reached in the playback state). When a torque exceeding a prescribed overload greater than the above-mentioned prescribed overload is applied to fast speed gear 38, fast speed gear 38 ceases to rotate. When this happens, since drive gear 37 is being rotated clockwise by the drive from motor 20, hook part 37g of torque limiter level 37c is forced to disengage from projecting parts 38a, 38b. It is forced to disengage again when it engages with projecting parts 38c, 38d, and this process is repeated, so that a state is produced in which the rotation of fast speed gear 38 stops and that of drive gear 37 continues. This state corresponds to the state described below in which the end of the tape is reached in the fast forward and rewind states. By the coupling of drive gear 37 to fast speed gear 38 by means of torque limiter lever 37c, and the coupling of fast speed gear 38 to normal speed gear 39 by means of friction member 40, a situation is brought about in which there is a difference between the maximum torque's transmittable by the two methods of coupling. The reason for this will be explained below.

When the tape player is in the fast forward or rewind modes, fast forward operating slider 29 or rewind operating slider 28 is latched in the depressed position by latch slider 21, drive gear 37 rotates in the clockwise direction driven by motor 20, and fast speed gear 38 and normal speed gear 39 rotate with it in the same direction. As a result, as well as reel spindle 18c or 19c being rotated respectively via fast forward gear 41d or rewind gear 42b meshing with fast speed gear 38, ASO lever carries out its oscillating movement.

When, in the fast forward or rewind mode, the end of the tape is reached, the rotation of reel spindle 19c or 18c respectively is arrested. As a result, the rotation of fast speed gear 38 stops, and a state is produced in which fast speed gear 38 is stationary and, as previously explained, drive gear 37 is rotating. When fast speed gear 38 ceases to rotate, so does normal speed gear 39, and the torque force is no longer applied to bias lever 39c. As a result, drive take-up part 22e of ASO lever 22 engages with drive part 37e of drive gear 37, and latch slider 21 slides in the direction of arrow E in FIG. 11. By this means, the latch on fast forward operating slider 29 and rewind operating slider 28, which had been latched by latch slider 21, is released, and the ASO operation is effected.

The fast speed gear 38 which transmits its drive to reel spindle 19c or 18c in the fast forward or rewind mode, normal speed gear 39 which transmits its drive to reel spindle 19c in the record or playback mode, and bias lever 39c are all mounted on the same spindle 37a. Consequently the space they occupy is reduced, which contributes to the miniaturization of the tape player. Additionally the fact that all these parts are easy to produce as a subassembly is advantageous for ease of assembly. Further, as fast speed gear 38 and normal speed gear 39 both rotate in the same direction, there is no need to take into account the differences in the direction of rotation of reel spindles 19c, 18c in the record, playback, fast forward and rewind modes, which makes the construction of the ASO mechanism simplier and its operation more reliable. Moreover, since fast speed gear 38 is driveably coupled to reel spindles 19c and 18c which act as the take-up side for the tape in the fast forward and rewind modes respectively and reel spindles 18c and 19c, which act as the supply side for the tape in the fast forward and rewind modes respectively, freewheeling smooth running can be achieved in the fast forward and rewind modes, without any unnecessary back tension being applied to the tape.

The fact the miniaturization is improved by having fast speed gear 38, normal speed gear 39 and bias lever 39c all mounted on the same spindle 37a as described above, constitutes a distinctive feature of this invention.

An explanation follows regarding the coupling of drive gear 37 to fast speed gear 38, the coupling of fast speed gear 38 to normal speed gear 39 via friction member 40 and coil spring 40a, and the resultant difference between the maximum torques transmitted by the two couplings. In the fast forward and rewind modes, the drive from fast speed gear 38 is transmitted to reel spindles 19c and 18c respectively, while in the record and playback modes the drive from normal speed gear 39 is transmitted to reel spindle 19c. In a conventional tape player, it is known that reel spindles 19c and 18c must rotate at high speed in the fast forward and rewind modes respectively, and therefore the drive power causing reel spindles 19c, 18c to rotate in these modes must be greater than the drive power which causes reel spindle 19c to rotate in the record and playback modes. If the drive power which causes reel spindle 19c to rotate in the record and playback modes is made the same as that which causes reel spindles 19c and 18c to rotate in the fast forward and rewind modes, reel spindle 19c is driven in the record and playback modes with a power input greater than required. This leads to the application of unnecessary tension on the tape, and thus to possible damage to the tape when the end of the tape is reached. It is undesirable also from the point of view of power consumption.

By coupling drive gear 37 to fast speed gear 38 via torque limiter lever 37c, and making the coupling via friction member 40 between fast speed gear 38 and normal speed gear 39 exhibit a lower maximum torque transmission characteristic than that between drive gear 37 and fast speed gear 38, the level of the drive power applied to reel spindles 19c, 18c in the record and playback modes on the one hand and in the fast forward and rewind modes on the other can be set at an appropriate value in each case.

One means of coupling drive gear 37 to fast speed gear 38 would be to interpose a friction member between them. But this would require the provision, in addition to springs 40a, 39d shown in FIG. 3, of a separate spring to press fast speed gear 38 into contact with drive gear 37; and unless this spring produced a thrust approximately 10 times that of spring 38b, it would not be possible to produce the difference in maximum torque transmission characteristics between the two couplings described above, and this would make the construction more complicated and of little practical value.

By coupling drive gear 37 to fast speed gear 38 by means of torque limiter lever 37c and spring 37b as shown in FIG. 11, a coupling can be effected which is of simple construction and has the desired maximum torque transmission characteristic, and is therefore of great practical value.

Next, a protective feature, using the ASO mechanism described above, is incorporated into the tape player. This protective feature stops the tape player automatically by means of the ASO mechanism in the event the cassette holder 13 is opened while the tape is running in the record, playback, fast forward or rewind modes. It thereby prevents the tape from wrapping itself around capstan 16, or from being damaged in other ways. Projecting piece 22f is formed on ASO lever 22 near its drive take-up part 22e as shown in FIG. 12. Projecting piece 22f can engage with one end of cassette holder open/shut detection lever 23. Cassette holder open/shut detection lever 23 is rockably supported on spindle 23a mounted on main chasis 11. Inclined part 23b, which can engage with tip 13e of extension 13d projecting from one retaining part 13c of cassette holder 13, is formed at the other end of cassette holder open/shut detection lever 23. Cassette holder open/shut detection lever 23 is biased in the clockwise direction, tending to make one end of cassette holder open/shut detection lever 23 engage with projecting piece 22f of ASO lever 22, by coil spring 23e which is anchored to projecting part 23c formed between the end just mentioned of cassette holder open/shut detection lever 23 and spindle 23a, and to projecting part 23d formed on main chasis 11.

Figure 13A:
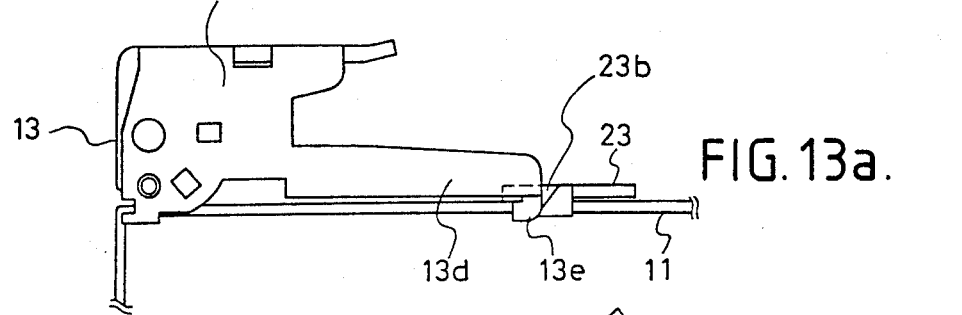
FIGS. 13(a) and 13(b) are side views showing the relation between the cassette holder and the cassette holder open/shut detection lever.

When cassette holder 13 is closed, because its tip 13e presses inclined part 23b of cassette holder open/shut detection lever 23 to the right in FIG. 13(a), cassette holder open/shut detection lever 23 moves counterclockwise in FIG. 12, further tensioning spring 23e. As a result, the above-mentioned end of cassette holder open/shut detection lever 23 disengages from projecting part 22f of ASO lever 22, and ASO lever 22 oscillates freely in the manner already described.

Figure 13B:
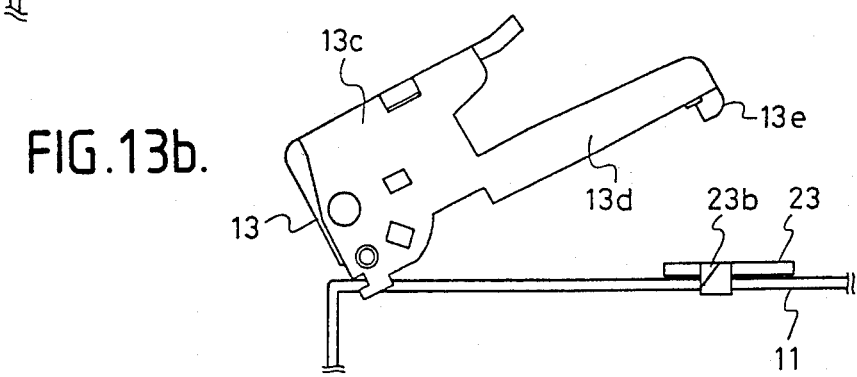

On the other hand, when cassette holder 13 is opened, tip 13e is disengaged from inclined part 23b of cassette holder open/shut detection lever 23 as shown in FIG. 13(b). The cassette holder open/shut detection lever 23 is rocked by the tension in spring 23d clockwise. As a result, the end of cassette holder open/shut detection lever 23 engages with projecting part 22f of ASO lever 22, and ASO lever 22 rocks counterclockwise. When this happens, ASO lever 22 comes to rest in approximately the same position as when its engaging part 22c was in contact with the maximum-radius part of the profile of eccentric cam 37d on drive gear 37.

We now assume that cassette holder 13 is in the closed position, and that playback operating slider 26 has been latched by latch slider 21. Then, as already described, with drive gear 37 being rotated clockwise (FIG. 12) and the tape running, ASO lever 22 oscillates and the tape player is in the normal playback mode.

Figure 14:
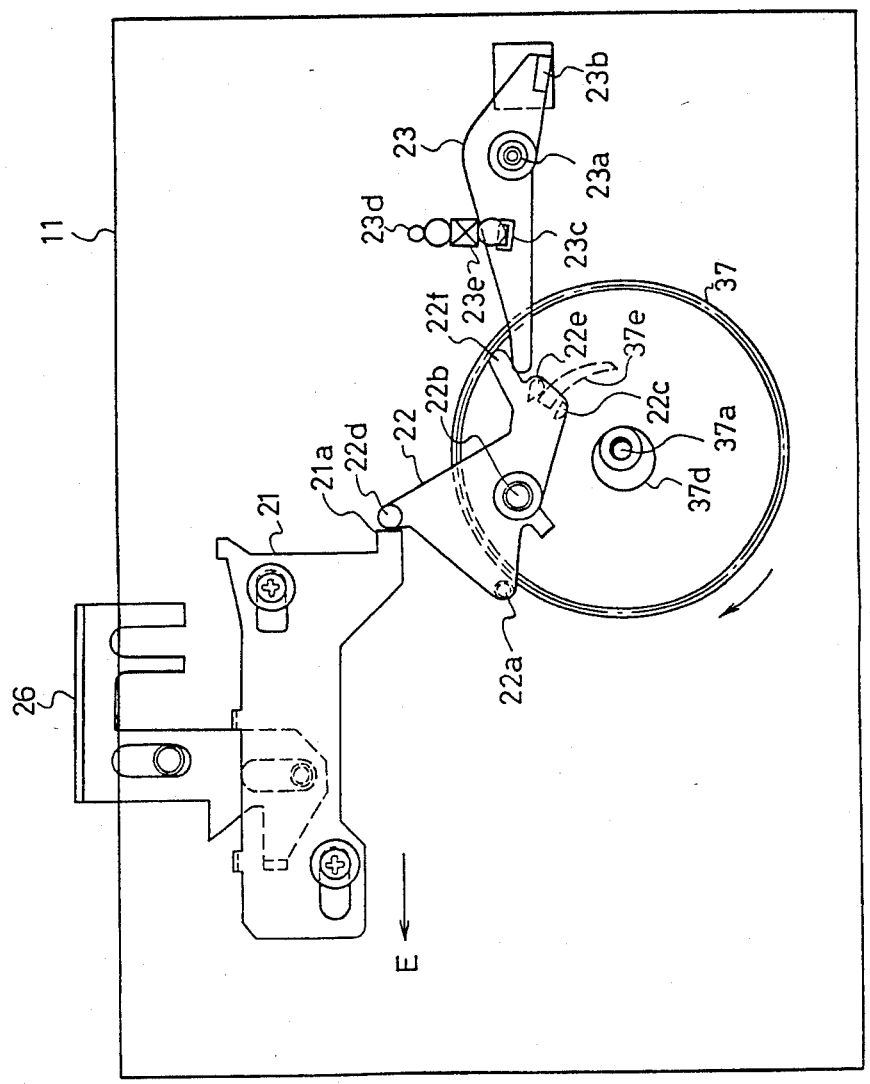
FIG. 14 is a plan view showing the working of the ASO mechanism when the cassette holder is opened.

If we suppose now that, while in this playback mode, cassette holder 13 is opened, cassette holder open/shut detection lever 23 rocks clockwise, and ASO lever 22 is forced to rock counterclockwise, against the torque thrust received from bias lever 39c. As a result, when drive gear 37 rotates clockwise, its drive part 37e engages with drive take-up part 22e of ASO lever 22 as shown in FIG. 14. As with the ASO operation described earlier, projecting part 22d of ASO lever 22 engages with projecting part 21a of latch slider 21, and slides latch slider 21 in the direction of arrow E in FIG. 14. As a result, playback operating slider 26 returns to the released state, the rotation of motor 20 is stopped, and accidents such as the wrapping of the tape around capstan 16 can be prevented. This protective feature operates in a similar manner, in the event the cassette holder 13 is opened while in any of the record, fast forward and rewind modes.

With this protective feature, therefore, since it uses the ASO mechanism, the only additional parts needed to put the tape player in the stop state as soon as cassette holder 13 is opened, are cassette holder open/shut detection lever 23 and spring 23e. The construction is extremely straightforward and the operation is highly reliable.

Latch slider 21 latches record, playback, fast forward and rewind operating sliders 25, 26, 28, 29 in the depressed position, and, by engaging with stop operating slider 27 and ASO lever 22, releases the latch on each of these operating sliders 25, 26, 28, 29. This gives a greater degree of freedom in positioning the various moving members and gears, mounted on the underside of main chasis 11 (FIG. 1), which contributes to smooth and reliable operation. For similar reasons, ASO lever 22, cassette holder open/shut detection lever 23 and fast speed slider 24 are also mounted on the upper side of main chasis 11 (FIG. 1).

As will be clear from FIG. 1, the arrangement is such that latch slider 21, ASO lever 22, cassette holder open/shut detection lever 23 and gear control slider 43 are disposed in the neighborhood of reel platforms 18, 19 and between an imaginary line through the axes of reel platforms 18, 19 and operating section 12, and are not placed in the neighborhood of base 13a of cassette holder 13. This is because of the shape of the half-shells of the housing of the cassette tape.

The shape of each half-shell is such, as is well known, that the thickness of the part of the cassette tape in which the head and pinch roller insertion apertures are formed is greater than that of the other part. This difference in thickness is particularly marked in the half-shell of the conventional 'compact' cassette tape. The cassette tape fits into cassette holder 13 in such a way that the thicker part of the cassette tape faces base 13a of cassette holder 13. Therefore, if latch slider 21 etc. were to be placed on main chasis 11 anywhere near base 13a of cassette holder 13, the overall thickness of the tape player would be increased, which would constitute an obstacle to miniaturization.

This invention is not limited to the embodiment described above. It can be embodied in various modified forms, provided there is no departure from its essential substance.

What is claimed is:

1. A tape player having operating modes including normal speed and high speed and being connected to driving means, comprising:
    a. a chassis;
    b. a spindle mounted on said chassis;
    c. a drive body rotatably mounted on said spindle, said drive body being responsive to said driving means and rotating continuously regardless of the operating mode of said tape player;
    d. a fast speed body and a normal speed body both rotatably mounted on said spindle to rotate in a given direction together with said drive body;
    e. first and second reels used, respectively, for take-up and supply of the tape;
    f. fast speed transmission means for transmitting the rotation of said fast speed body to said first reel for take-up of the tape during high-speed running of the tape player; and
    g. normal speed transmission means for transmitting the rotation of said normal speed body to said first reel for take-up of the tape during normal speed running of the tape player.

2. The tape player as claimed in claim 1, further comprising first uncoupling means for uncoupling said fast speed body from said drive body when the end of the tape is reached during high-speed running of the tape, and second uncoupling means for uncoupling said normal speed body from said fast speed body when the end of the tape is reached during normal speed running of the tape.

3. The tape player as claimed in claim 1, wherein said fast speed body is disengageably connected to said drive body to rotate with said drive body but to disengage from said drive body when a reverse torque exceeding a first prescribed overload is exerted on said fast speed body, and wherein said normal speed body is disengageably connected to said fast speed body to be driven by said drive body when said fast speed body rotates with said drive body but to disengage from said fast speed body when a reverse torque exceeding a second prescribed overload is exerted on said normal speed body.

4. The tape player as claimed in claim 3, further comprising a torque limiter lever pivotally attached to said drive body and first spring means connecting said torque limiter lever to said drive body, said torque limiter lever being positioned between said drive body and said fast speed body and having a first end for engaging said fast speed body, and said first spring means biasing said first end toward engagement with said fast speed body.

5. The tape player as claimed in claim 3, further comprising a frictional member positioned between said fast speed body and said normal speed body and a second spring means for forcing said normal speed body against said frictional member to frictionally connect said fast speed body and said normal speed body.

6. The tape player as claimed in claim 1, wherein said drive body includes a cam part and an engaging part and said tape player further comprises:
    a bias force member pivotally mounted on said spindle and biased to pivot in one direction when said fast speed body rotates in the high-speed mode or when said normal speed body rotates in the normal speed mode; and a shut-off member, movable in a first direction responsive to the pivoting of said bias force member and movable in a second direction responsive to the rotation of said cam part of said drive body, said shut-off member engaging with said engaging part of said drive body when said tape is stopped for automatic shut-off.

7. The tape player as claimed in claim 6, wherein said shut-off member is mounted on said chassis.

8. The tape player as claimed in claim 6, wherein said bias force member is frictionally connected to said fast speed and normal speed bodies.

9. The tape player as claimed in claim 6, further comprising:
 a cassette holder pivotally operable between an open and a closed position and having a projection member;
 linkage means engageable with said projection member and with said shut-off member so that said shut-off member engages with said engaging part of said drive body when said cassette holder is open to automatically shut off the running of the tape and disengages with said engaging part of said drive body when said cassette holder is closed.

10. A tape player for playing a tape cartridge, comprising:
 a. a chassis;
 b. a drive motor;
 c. a spindle mounted on said chassis;
 d. a drive body rotatably mounted on said spindle and driven by said drive motor;
 e. a fast speed body rotatably mounted on said spindle;
 f. a normal speed body rotatably mounted on said spindle;
 g. first and second reel spindles rotatably mounted on said chassis and engaging, respectively, the take-up and supply reels of said tape cartridge;
 h. fast speed transmission means for transmitting the rotation of said fast speed body to said first reel spindle during fast forward operation of said tape player;
 i. normal speed transmission means for transmitting the rotation of said normal speed body to said first reel spindle during record or playback operation of said tape player;
 j. means for engaging either said fast speed transmission means or said normal speed transmission means;
 k. first coupling means for disengageably coupling said fast speed body to said drive body, said first coupling means uncoupling when said fast speed transmission means is engaged and said fast speed body is stopped; and
 l. second coupling means for disengageably coupling said normal speed body to said fast speed body, said second coupling means uncoupling when said normal speed transmission means is engaged and said normal speed body is stopped.

11. The tape player as claimed in claim 10, further comprising rewind transmission means for transmitting the rotation of said fast speed body to said second reel spindle during rewind operation of said tape player.

12. The tape player as claimed in claim 10, further comprising means for automatically shutting off power to said drive motor when the end of the tape of said tape cartridge is reached.

13. The tape player as claimed in claim 12, wherein said means for automatically shutting off power includes:
 a. an eccentric cam fixedly connected to said drive body and through which said spindle is projected;
 b. an engaging part fixedly connected to said drive body and departed radially from said eccentric cam with respect to said drive spindle;
 c. a bias lever having a free end and having a pivot end pivotally connected to said spindle;
 d. a friction coupling coupling said pivot end of said bias lever to said normal speed body so that the rotation of said normal speed body transmits torque to said bias lever through said friction coupling;
 e. switch means for shutting off power to said drive motor; and
 f. a shut-off lever pivotally connected to said chassis and having a first end including a first projecting part engageable with said swith means, said first end being connected to said free end of said bias lever, and a second end including cam following means, said cam following means engaging said eccentric cam when said normal speed body rotates and transmits torque to said bias lever, and said cam following means engaging said engaging part when said normal speed body is stopped, so that said engaging part pushes said second end of said shut-off lever away from said eccentric cam and said first projecting part of said shut-off lever engages said switch means, cutting off power to said drive motor.

14. The tape player as claimed in claim 13, further comprising:
 a cartridge holder pivotally connected to said chassis and operable between an open position and a closed position, said cartridge holder including a second projecting part;
 a detection lever pivotally connected to said chassis, said detection lever having a first end engaging said second projecting part of said cartridge holder when said cartridge holder is in said closed position, and a second end engageable with said shut-off lever; and
 spring means biasing said first end of said detection lever toward said second projecting part of said cartridge holder so that, when said cartridge holder is opened, said second projecting part releases said first end of said detection lever and said detection lever pivots and engages said shut-off lever, pivoting said shut-off lever in a direction causing said first projecting part of said shut-off lever to engage said switch means, cutting off power to said drive motor.

15. The tape player as claimed in claim 14, wherein said shut-off lever and said detection lever are positioned between the top surface of said chassis and said tape cartridge.

16. A tape player for playing a tape cartridge, comprising:
 a. a chassis;
 b. a drive motor;
 c. a capstan rotatably connected to said chassis and driven by said drive motor, said capstan including a capstan pinion;
 d. a spindle mounted on said chassis;
 e. a drive gear rotatably mounted on said spindle and driven by said capstan pinion;

f. a fast speed gear rotatably mounted on said spindle and disengageably coupled to said drive gear, said fast speed gear uncoupling from said drive gear when a reverse torque exceeding a first prescribed overload is exerted on said fast speed gear;

g. a normal speed gear rotatably mounted on said spindle and disengageably coupled to said fast speed gear, said normal speed gear uncoupling from said fast speed gear when a reverse torque exceeding a second prescribed overload is exerted on said normal speed gear;

h. first and second reel spindles rotatably mounted on said chassis and engaging, respectively, the take-up and supply reels of said tape cartridge;

i. fast speed transmission means for transmitting the rotation of said fast speed gear to said first reel spindle;

j. normal speed transmission means for transmitting the rotation of said normal speed gear to said first reel spindle;

k. rewind transmission means for transmitting the rotation of said fast speed gear to said second reel spindle;

l. means for selectably engaging said fast speed transmission means, said normal speed transmission means, or said rewind transmission means, exclusively;

m. an eccentric cam fixedly connected to said drive gear and through which said spindle is projected;

n. an engaging part fixedly connected to said drive gear and departed radially from said eccentric cam with respect to said spindle;

o. a bias lever having a free end and having a pivot end pivotally connected to said spindle;

p. a friction coupling coupling said pivot end of said bias lever to said normal speed gear so that the rotation of said normal speed gear transmits torque to said bias lever through said friction coupling;

q. switch means for shutting off power to said drive motor;

r. a shut-off lever pivotally connected to said chassis and having a first end including a first projecting part engageable with said switch means, said first end being connected to said free end of said bias lever, and a second end including cam following means, said cam following means engaging said eccentric cam when said normal speed gear rotates and transmits torque to said bias lever, and said cam following means engaging said engaging part when said normal speed gear is stopped so that said engaging part pushes said second end of said shut-off lever away from said eccentric cam and said first projecting part of said shut-off lever engages said switch means, cutting off power to said drive motor;

s. a cartridge holder pivotally connected to said chassis and operable between an open position and a closed position, said cartridge holder including a second projecting part;

t. a detection lever pivotally connected to said chassis, said detection lever having a first end engaging said second projecting part of said cartridge holder when said cartridge holder is in said closed position and a second end engageable with said shut-off lever; and u. spring means biasing said first end of said detection lever toward said second projecting part of said cartridge holder so that, when said cartridge holder is opened, said second projecting part releases said first end of said detection lever and said detection lever pivots and engages said shut-off lever, pivoting said shut-off lever in a direction causing said first projecting part of said shut-off lever to engage said switch means, cutting off power to said drive motor.

17. The tape player as claimed in claim 16, wherein said first prescribed overload is greater than said second prescribed overload.

* * * * *